Figure 1:
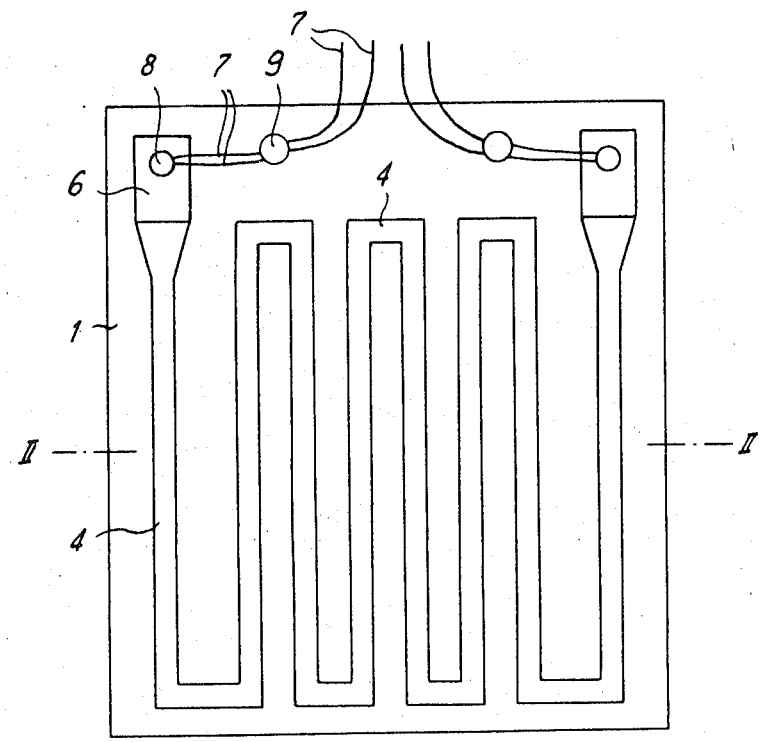

United States Patent [19]

Von Brüning

[11] 3,720,900

[45] March 13, 1973

[54] THIN-FILM RESISTANCE THERMOMETER HAVING LOW OHMIC CONTACT STRIPS

[75] Inventor: Drost M. Von Brüning, Zurich, Switzerland

[73] Assignee: Mettler Instrumente AG, Zurich, Switzerland

[22] Filed: June 25, 1970

[21] Appl. No.: 49,803

[30] Foreign Application Priority Data

July 8, 1969  Switzerland .................... 10425/69

[52] U.S. Cl. .................................................. 338/25
[51] Int. Cl. ............................................... H01c 7/00
[58] Field of Search....338/25, 22, 23, 292, 293, 300, 338/306, 307, 308, 309, 314; 117/212, 217

[56] References Cited

UNITED STATES PATENTS

| 3,381,256 | 4/1968 | Schuller | 338/309 |
| 2,727,118 | 12/1955 | Longini | 338/25 |
| 3,452,314 | 6/1969 | Sapoff | 338/22 |
| 3,054,978 | 9/1962 | Schmidlin | 338/25 |
| 3,377,697 | 4/1968 | Hobbs | 117/212 |
| 3,201,736 | 8/1965 | Ovshinsky | 338/25 |
| 3,308,528 | 3/1967 | Bullard | 338/309 |

Primary Examiner—R. Skudy
Attorney—Lawrence E. Laubscher

[57] ABSTRACT

Temperature-responsive thin-film resistor of the type including a ribbon of resistive material supported on a base layer, characterized in that the composition and cross-sectional dimensions of said resistive ribbon are such as to produce a positive variation in electrical resistance of at least 5 percent per degree Kelvin at any point within a 10° interval up to 30° Kelvin and further that low ohmic contact strips are provided at the ends of the resistive ribbon. Preferably the resistive material is selected from the group consisting of lead, cadmium, indium, thallium, gold and stabilized β-tin.

10 Claims, 2 Drawing Figures

Inventor:
Drost M. Von Brüning

By:
Lawrence E. Laubscher
Attorney

THIN-FILM RESISTANCE THERMOMETER HAVING LOW OHMIC CONTACT STRIPS

Electrical resistance-thermometry techniques afford a sensitive method for the determination of absolute temperatures in technology and science. In addition to semiconducting thermistors and the well known resistance wires made from a metal having a sufficiently high temperature-coefficient (e.g., platinum, nickel or lead), metallic thin-layer-resistance thermometers have been disclosed for the determination of absolute temperatures in the range of room-temperature and above. Metallic resistance wires are suitable for the measurement of low temperatures (especially below 20° Kelvin, only to a limited extent. In order to obtain reproducible results, such wires must be attached relatively loosely to the object which is to be measured, resulting in poor heat conducting between the wire and the object. Therefore resistance-thermometers made from wires react slowly at low temperatures, especially in a vacuum, becoming useless for many purposes. Furthermore, there exist considerable technical difficulties in the manufacture and processing of very thin temperature-responsive resistance-wires, which, at low temperatures, have a low heat capacity and afford a sufficiently high ohmic value. Generally the resistance-thermometers made from a graphite layer (for example, the conventional radio resistances) or consisting of semiconducting single crystals (e.g., Germanium) are currently used for the measurement of low temperatures. Temperatures from about 0.05° to about 100° Kelvin can be sensitively and reliably measured with these two types of thermometers; in this range their temperature coefficient is negative.

Until now, thin layers formed from metallic superconductors (e.g., tin) have been used at low temperatures in radiation meters (for example, bolometers), and can only be used for the proof of temperature changes in the small region of superconducting transition temperatures. When desired, this region is reversibly shifted by the action of an external magnetic field. However these bolometers are not qualified for the determination of absolute temperatures in the range between the superconducting transition temperature and room temperature.

The primary object of the present invention is to provide an electric resistance-thermometer with a positive temperature-coefficient, which device is useful for the rapid measurement of absolute temperatures in the range from room temperature to low temperatures. The resistance-thermometer according to the invention is characterized by the use of a resistive layer the composition and cross-sectional dimensions of which produce a relative resistance-change of this layer with temperature having a positive value of at least 5 percent per degree at any point within a 10° interval up to 30° Kelvin.

In accordance with a more specific object of the invention, the electrical resistance-layer comprises a metal selected from the group consisting of lead, cadmium, indium, thallium, gold or stabilized β-tin. With the exception of gold, all of the above mentioned metals are well-known superconductors, the transition temperature under the most favorable conditions determining the lowest limit for temperature measurements using these thermometers. In fact, however, with all these metals, the lower limit of a temperature coefficient of the electric resistance useful for temperature measurements depends on the thickness of the metallic layer, its purity and the aging of the layer on its support.

In accordance with a preferred form of the invention, the ends of a resistance band are connected with low ohmic electrical contact strips that are fixed to the support of the resistance layer. The electric resistance of the contact strips is less than about one hundredth of the resistance of the band even at low temperatures. The thickness of the resistance-layer is generally thinner than 5 microns and preferably on the order of 0.1 to 1 micron. The lower limit of layer thickness is determined by the known decrease of the temperature coefficient of the resistance with decreasing thickness, by purity and by the type of the layer metal. On the other hand, resistance bands which are too thick become mechanically unstable and, with large changes in temperature, may even crack or break, especially if the coefficient of thermal expansion of the resistance metal is different from that of the support material. Moreover, thick layers possess too low an ohmic value, thereby reducing the accuracy of the measurements.

Figure 2:
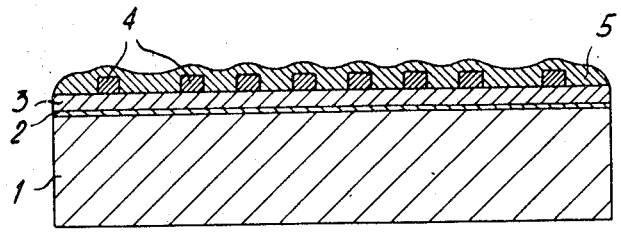

Other objects and advantages of the present invention will become apparent from a study of the following specification when viewed in the light of the accompanying drawing, in which:

FIG. 1 is an enlarged plan view of the temperature-responsive resistance means of the present invention; and FIG. 2 is a sectional view taken along line 2—2 of FIG. 1.

Referring now to the drawing, the base plate 1 is formed of glass or other suitable insulating material and has a thickness of about 1 mm and a surface area of about 7cm$^2$. A layer 2 of chromium (a current conducting material) having a thickness of about 0.06 micron is deposited on the base plate, and a layer 3 of insulating material (such as silicon monoxide) having a thickness of about 0.7 micron is deposited on the chromium layer. Deposited on the insulating layer 3 is the temperature-responsive resistive layer 4 which comprises a thin ribbon of lead having a serpentine configuration. The lead ribbon has a thickness of about 0.6 micron, a width of about 0.2 mm, and a length of about 60 cm. The ends of the resistive ribbon 4 are connected with silver contact strips 6 the width of which is about 0.5 mm. The lead ribbon 4 is covered by a protective film 5 of insulating material (such as silicon monoxide) having a thickness of about 0.2 mm. Two pairs of insulated copper wires 7 are electrically connected with the ends of said lead ribbon, respectively, by conductive silver paste 8, said wires being physically secured to the laminate body by an adhesive 9. Preferably the electrical conductors have a diameter of about 0.025 mm.

The measured resistances of the serpentine lead ribbon of the described thermometer were 1,330 ohms at 273° K., 52 ohms at 20° K., and about 15 ohms at 10° K. For the relative resistance change of this resistance-thermometer as a function of temperature, the following values were measured at low temperatures, given in percent of relative resistance change per degree:

T (°K) relative resistance change = a
10° 14 % / degree
b 15° 12.5 % / degree
20° 9 % / degree The percent relative change $a$ of the electric resistance R for a certain temperature $T_n$, for which R has the value $R_{T_n}$, is expressed by the formula $$a = \frac{1}{R_{T_n}} \cdot (dR/dT) \cdot 100 \, (\% / \text{degree})$$

The primary advantage of the thermometer of the present invention is the possibility of a fast determination of absolute temperatures in the range from room temperature down to low temperatures by means of one single thermometer, thereby solving a technical problem in the art. Moreover, resistance-thermometry by means of suitable thin metal layers is at least as advantageous at low temperatures as at room temperatures, if not more so. If the object for measurement itself serves as the support, the thermometer, in practice, is distinguished by a very small heat capacity. It covers a large part of the surface of its support, thereby providing optimal thermal contact whereby a very fast determination of the surface temperature is achieved even of poor heat conductors in high vacuum. The relatively high absolute value of the electrical resistance of the resistance band made from the previously mentioned metals even at low temperatures, as well as the considerable relative change of the electrical resistance with temperature in this range, makes it an instrument for the detection also of very small temperature changes. Moreover, the sensitivity can also be increased because good thermal contact between the support and resistive layer in many cases permits the use of considerable electric currents without extensively overheating the thermometer above the temperature of the support, as distinguished from conventional thermometers. Furthermore, the relatively high resistance of the thermometer, even at low temperatures, permits the use of relatively high ohmic electrical connection wires which have a higher thermal resistance than low ohmic wires, thereby diminishing the generally unwanted heat transport via the connection wires.

The calibration of serially manufactured types of thermometers according to the invention is especially easy. If the temperature dependence of the electrical resistance of one specimen of a production series is known, all the other thermometers of this series can be calibrated by control measurements at a few known reference temperatures. The technical manufacture is easy and relatively inexpensive too. The desired properties of the thermometer such as the absolute value of the resistance at a certain temperature and the temperature-sensitivity at low temperatures, can also be fixed within certain limits during the manufacture.

All non-porous solid materials which do not crack during cooling and rewarming are suitable supports. The surfaces of the support in contact with the thermometer layer are preferably bright. Possible supports include the object of temperature measurement itself, as well as electric conductors with a low ohmic surface, e.g., a metal plate or a support which, by chemical action, disturbs the reproducibility of the thermometer metal. In these cases an insulating or protective film of a non-conducting material, e.g., silicon monoxide or aluminum oxide ($Al_2O_3$), is applied between the support and the resistive layer. The resistive layer may also be covered by another protective film to prohibit external disturbances (for example, corrosion) caused by oxygen and moisture from the air.

The electrical resistance of the thermometer is determined by the chosen metal as well as by the length, width and thickness of the resistance-layer, together with its purity and micro structure. Resistive layers which have a sufficiently high temperature coefficient and resistance for good measuring accuracy (e.g. 40 ohm at 10° Kelvin) may be in the form of a narrow, long, thin band (e.g., a band having a serpentine or other configuration).

The previously mentioned metals (lead, cadmium, indium, thallium, gold and stabilized ($\beta$-tin) are especially well-qualified for the resistance-layer of the thermometer for two reasons. First, they satisfy the demands for durability, reproducibility and applicability on a great variety of supports; and secondly, one can produce from these metals resistance-layers for which the relative change of electrical resistance of the layer for each temperature in the interval between 10° and 20° Kelvin is, in part, considerably more than 5 percent per degree if the layer is not too thin and if the purest metal is used for its production. According to a further object of the invention, the thermometer is connected electrically to the measuring device by means of thin metal wires that are soldered, welded or glued with conducting paste to the previously mentioned contact strips of the thermometer. For greater durability, the contact wires are preferably attached to the support by glueing, pinching or tying.

The resistance-layer and the metallic contact strips are preferably produced by high vacuum evaporation of the metal on the bright, cleaned and well degassed surface of the support or to the insulating or protecting film on the support, respectively. If the insulating or protecting film is made from substances volatile in a vacuum, it can also be produced by high vacuum evaporation. The metallic resistance-layer may also be manufactured by other methods (for example, by cathode sputtering). The desired serpentine form of the resistance-layer may be obtained by covering the support with a suitable stencil during the manufacture of the layer.

While in accordance with the provisions of the Patent Statutes, the preferred form and embodiments of the invention have been illustrated and described, it will be apparent to those skilled in the art that various changes may be made in the apparatus described without deviating from the invention concept.

What is claimed is:

1. Temperature-responsive resistance means, comprising
    a base plate (1);
    a layer of resistive material (4) supported by said base plate, said resistive layer being in the form of a relatively thin ribbon the composition and cross-sectional dimensions of which are selected to produce a positive variation in the electrical resistance of said resistive layer of at least 5 percent per degree at any point within a 10° interval up to 30° Kelvin; and
    a pair of contact strips (6) attached to said base plate and electrically connected with the ends of said resistive ribbon, respectively, said contact strips having a total resistance value less than approximately one hundredth of the resistance value of said resistive ribbon.

2. Temperature-responsive resistance means as defined in claim 1, wherein the resistive material is selected from the group consisting of lead, cadmium, indium, thallium, gold and stabilized β-tin.

3. Resistance means as defined in claim 1, and further including a layer of insulating material (3) arranged between said resistive layer and said support.

4. Resistance means as defined in claim 3, and further including a protective layer (5) covering said resistive layer.

5. Resistance means as defined in claim 4, wherein said layer of insulating material and said protective layer each consist of silicon monoxide.

6. Resistance means as defined in claim 1, wherein said layer of resistive material has a thickness of less than 5 microns.

7. Resistance means as defined in claim 6, wherein said layer of resistive material has a thickness of between 0.1 to 1 micron.

8. Resistance means as defined in claim 1, wherein the layer of resistive material exhibits at least an 8 percent positive resistance change per degree of temperature in the range of between 10° and 20° Kelvin.

9. Resistance means as defined in claim 1, and further including a pair of conductors (7), silver paste means (8) electrically connecting said conductors with said strips, respectively, and means (9) physically connecting portions of said conductors, respectively, with said base plate.

10. Resistance means as defined in claim 1, wherein each of said layers insulating material (3) resistive material (4), contact strips (6) and protective film (5) is formed on said base plate by evaporation in a high vacuum following degassing of said base plate.

* * * * *